(12) United States Patent
Morice, III et al.

(10) Patent No.: US 9,670,037 B2
(45) Date of Patent: Jun. 6, 2017

(54) PERSONNEL TRANSPORT AND TRANSFER SYSTEM

(71) Applicants: Natchez Morice, III, Morgan City, LA (US); Leslie Lallande, Morgan City, LA (US); Chris Gunter, Morgan City, LA (US)

(72) Inventors: Natchez Morice, III, Morgan City, LA (US); Leslie Lallande, Morgan City, LA (US); Chris Gunter, Morgan City, LA (US)

(73) Assignee: Advanced Personnel Pods, LLC, Morgan City, LA (US)

( * ) Notice: Subject to any disclaimer, the term of this patent is extended or adjusted under 35 U.S.C. 154(b) by 0 days.

(21) Appl. No.: 14/461,099

(22) Filed: Aug. 15, 2014

(65) Prior Publication Data

US 2015/0096485 A1    Apr. 9, 2015

Related U.S. Application Data

(60) Provisional application No. 61/888,488, filed on Oct. 8, 2013.

(51) Int. Cl.
| | |
|---|---|
| *B63B 27/00* | (2006.01) |
| *B66C 13/02* | (2006.01) |
| *B63B 27/10* | (2006.01) |
| *B63B 27/16* | (2006.01) |
| *B60N 2/24* | (2006.01) |
| *B60N 2/42* | (2006.01) |
| *B63B 27/30* | (2006.01) |

(52) U.S. Cl.
CPC .............. *B66C 13/02* (2013.01); *B60N 2/24* (2013.01); *B60N 2/4242* (2013.01); *B63B 27/10* (2013.01); *B63B 27/16* (2013.01); *B63B 27/30* (2013.01)

(58) Field of Classification Search
CPC ......... B66C 13/02; B66C 13/04; B66C 13/08; B60N 2/24; B60N 2/4242; B63B 27/16; B63B 27/10; B63B 27/30
USPC ...................................... 414/142.8
See application file for complete search history.

(56) References Cited

U.S. PATENT DOCUMENTS

| | | | | |
|---|---|---|---|---|
| 2,440,764 A | * | 5/1948 | Wilson .................... | B63B 19/00 114/117 |
| 3,480,157 A | * | 11/1969 | Anderson ............... | B66C 13/02 212/264 |
| 3,825,128 A | * | 7/1974 | Cooper .................... | B66C 13/06 212/274 |
| 4,297,757 A | * | 11/1981 | Palemon Camu ........ | B63C 9/06 114/138 |
| 4,395,178 A | * | 7/1983 | MacDonell ............. | B63B 27/30 114/259 |

(Continued)

*Primary Examiner* — Michael McCullough
*Assistant Examiner* — Lynn Schwenning
(74) *Attorney, Agent, or Firm* — Keaty Law Firm LLC

(57) ABSTRACT

A crew boat for transporting personnel to and from an offshore platform is equipped with a passenger capsule and a basket-like cradle, which retains the passenger capsule adjacent a passenger deck during the voyage. The passenger capsule forms a watertight enclosure, which can serve as a life raft in emergency. The passenger capsule is equipped with its own automated heave compensation system, power supply, and stabilization means. The passenger capsule is equipped to be lifted and lowered onto the cradle using platform-mounted cranes.

3 Claims, 22 Drawing Sheets

(56) References Cited

U.S. PATENT DOCUMENTS

| | | | | | |
|---|---|---|---|---|---|
| 4,630,542 | A | * | 12/1986 | Peyre | B66C 13/02 |
| | | | | | 104/112 |
| 4,739,721 | A | * | 4/1988 | Peyre | B63B 27/36 |
| | | | | | 104/114 |
| 5,590,616 | A | * | 1/1997 | Vera | B63B 1/14 |
| | | | | | 114/261 |
| 5,713,710 | A | * | 2/1998 | Strong | B63B 27/10 |
| | | | | | 114/350 |
| 6,431,105 | B2 | * | 8/2002 | Haram | 114/201 R |
| 6,659,703 | B1 | * | 12/2003 | Kirkley | B63B 27/10 |
| | | | | | 414/138.2 |
| 2001/0018015 | A1 | * | 8/2001 | Johnson | B63B 27/16 |
| | | | | | 414/139.5 |
| 2003/0026676 | A1 | * | 2/2003 | Grinsted | B63B 27/16 |
| | | | | | 414/137.7 |
| 2006/0236912 | A1 | * | 10/2006 | Haavie | B66C 13/02 |
| | | | | | 114/382 |
| 2009/0285657 | A1 | * | 11/2009 | Strong | B63B 27/16 |
| | | | | | 414/139.5 |

* cited by examiner

PERSONNEL TRANSPORT AND TRANSFER SYSTEM

CROSS-REFERENCE TO RELATED APPLICATIONS

This application is a nonprovisional application based on our provisional application Ser. No. 61/888,488 filed on Oct. 8, 2013, entitled "Personnel transport and transfer system," the full disclosure of which is incorporated by reference herein and priority of which is hereby claimed.

BACKGROUND OF THE INVENTION

The present invention relates to a transport and transfer system for personnel, and more particularly to a personnel transfer system for use when transferring crews from crew boats to offshore platforms, from one vessel to another, or from other spaced apart locations such as building roofs, heliports, etc.

Transporting crew members to and from offshore platforms is one of the necessary operations that involve the use of service vessels. Personnel is usually transported to the offshore platform location and then lifted to the platform deck using ropes, rope ladders, open lift platforms where the persons stand while the platform is raised from the service vessel to the platform deck, and other such unstable equipment. Wind and wave action considerably complicate this dangerous operation.

One of the more widely used methods of transferring crew members to and from the boats to platforms is for the crane operator on the platform to drop a fabric basket to the deck of the vessel, have the personnel throw their personal belongings and equipment into the middle of the basket and then grab the outside of the basket and lock their arms into the webbing of the basket. The crane operator then rapidly pulls the basket back up to the platform.

The reverse method when transporting personnel to the boat is to have the personnel throw their personal belongings into the basket, grab the outside of the basket and lock their arms into the webbing of the basket and have the crane operator very rapidly pull the basket and swing it on top of the boat's deck. The personnel transported in the basket need to release the basket before the crane lifts it as there is great danger in being tangled and pushed overboard.

Sparrows Engineering Group developed the Toro and the Frog personnel transfer capsules but these are at best seated versions of the cloth personnel baskets.

Helicopters have been serving the oil industry for over fifty years. The Gulf of Mexico oil field employs some 600 helicopters. Helicopters fly mostly during the day pursuant to Visual Flight Requirements (VFR) and fly up to 200 miles offshore, as deep water exploration, drilling, and production become increasingly practical. The helicopters are very expensive to operate and can only operate in the best weather conditions. Additionally helicopters can only carry a few passengers at a time.

The present invention contemplates elimination of drawbacks associated with conventional personnel transfer systems and provision of an improved system that is safe and effective in offshore and other operations.

SUMMARY OF THE INVENTION

It is, therefore, an object of the present invention to provide a comprehensive and safe solution for the transport of personnel from vessels maneuvering alongside offshore platforms and from the offshore platforms—to the vessel.

It is another object of the invention to provide a personnel transfer system that utilizes an enclosed personnel pod or capsule and a service vessel that is fully stabilized when maneuvering alongside an offshore platform.

These and other objects of the invention are achieved through the provision of an improved personnel transport and transfer system utilizing a passenger pod or capsule and a cradle positioned on a crew or delivery boat. During transport to and from an offshore location, the personnel are seated in a crew boat. At the destination, the personnel enter the passenger capsule and remain seated in the enclosed passenger capsule in harness-equipped seats. The passenger capsules are equipped with their independent power supply, automated heave compensation system and stabilization means. The pods are lifted and lowered to and from the crew boat using offshore platform-mounted cranes.

BRIEF DESCRIPTION OF THE DRAWINGS

Reference will now be made to the drawings, wherein like parts are designated by like numerals, and wherein.

DETAIL DESCRIPTION OF THE INVENTION

Figure 1:
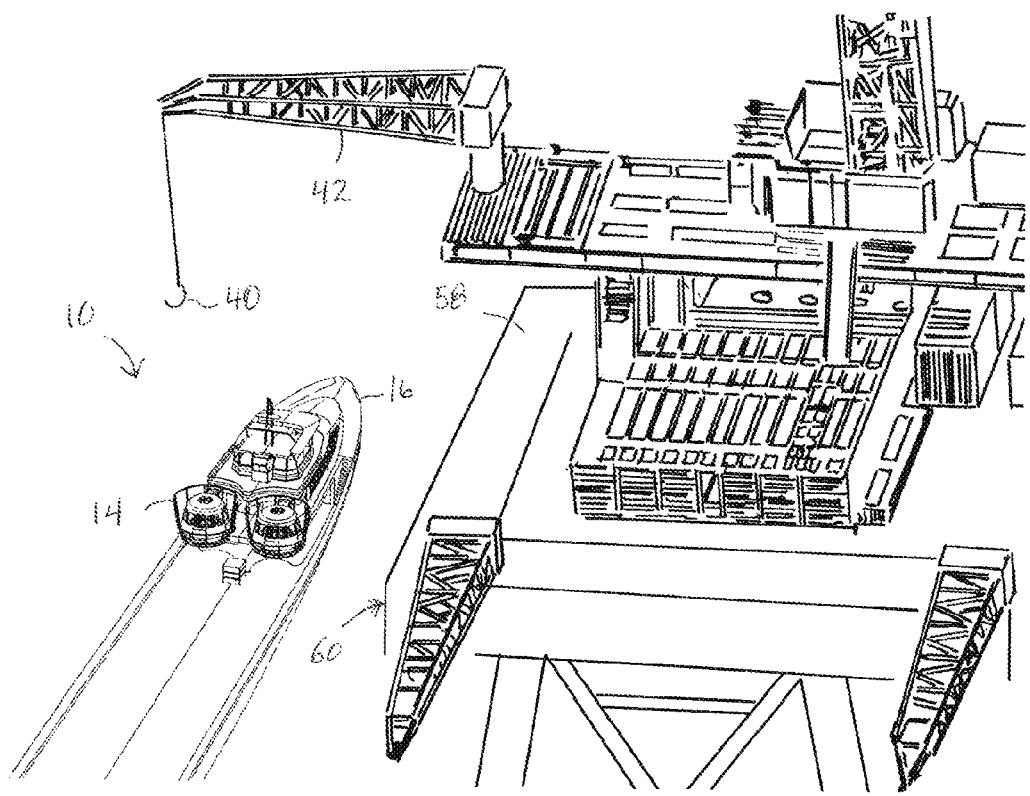
FIG. 1 is a perspective schematic view of the personnel system of the present invention showing a crew boat with two personnel pods positioned alongside a drilling platform.
Figure 2:
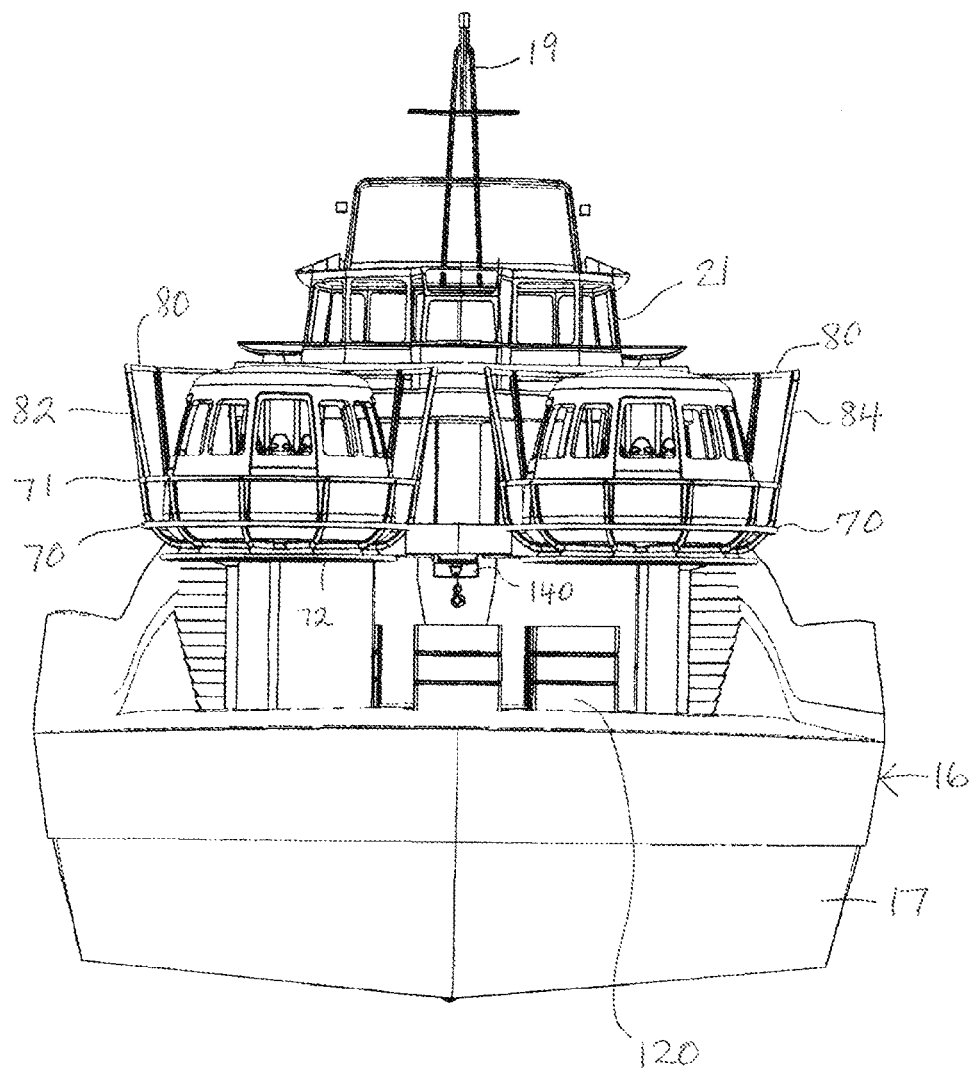
FIG. 2 is an aft view of the two personnel pods positioned within pod cradles on board a crew vessel.
Figure 3:
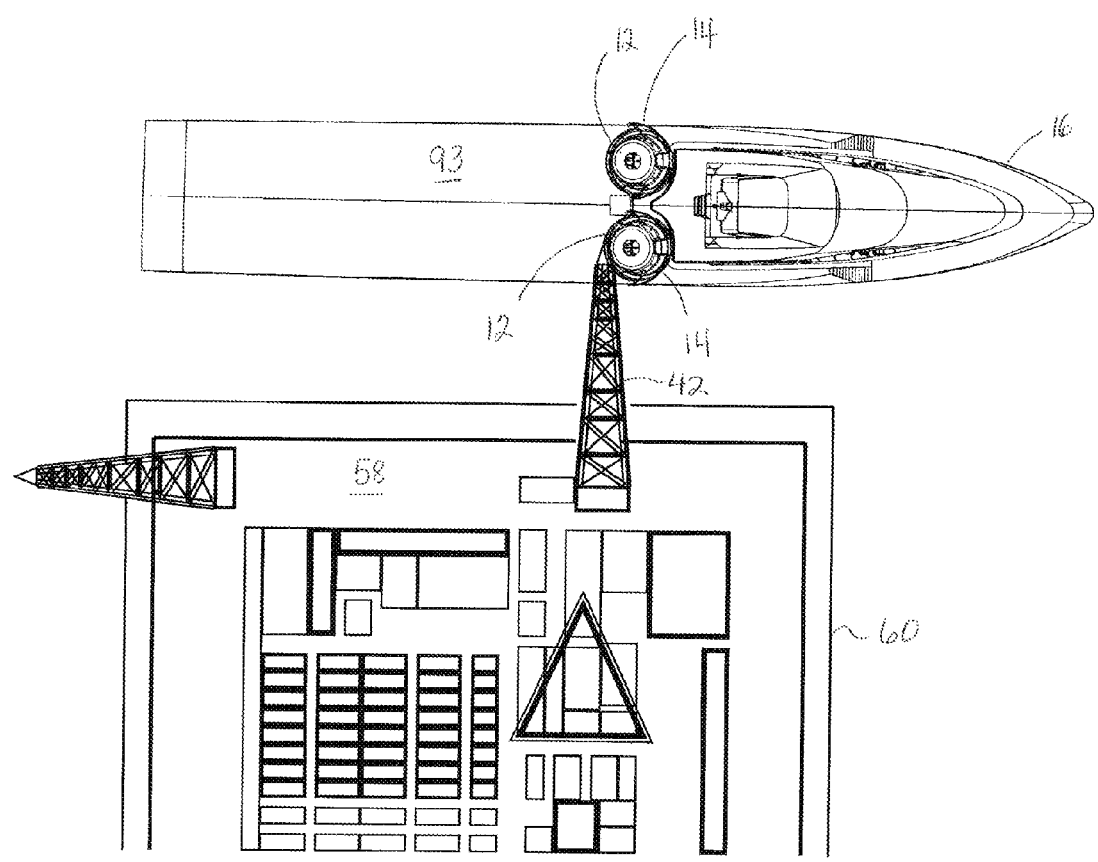
FIG. 3 is a top schematic view illustrating a platform-mounted crane engaging one of the personnel pods.
Figure 4:
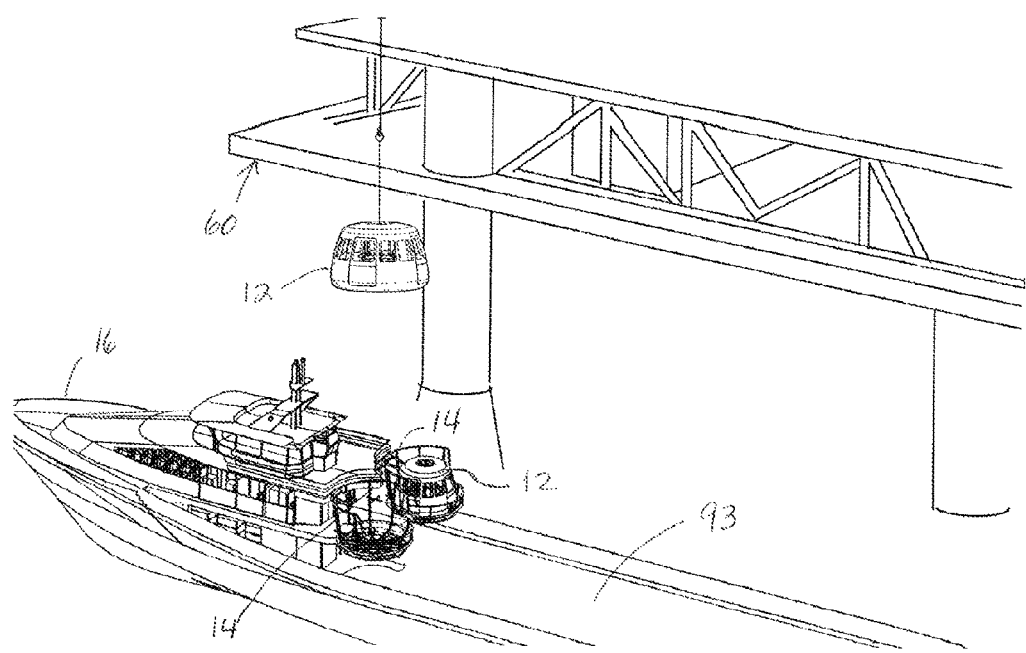
FIG. 4 illustrates one of the personnel pods being lifted by a platform-mounted crane from a boat-mounted pod cradle.
Figure 5:
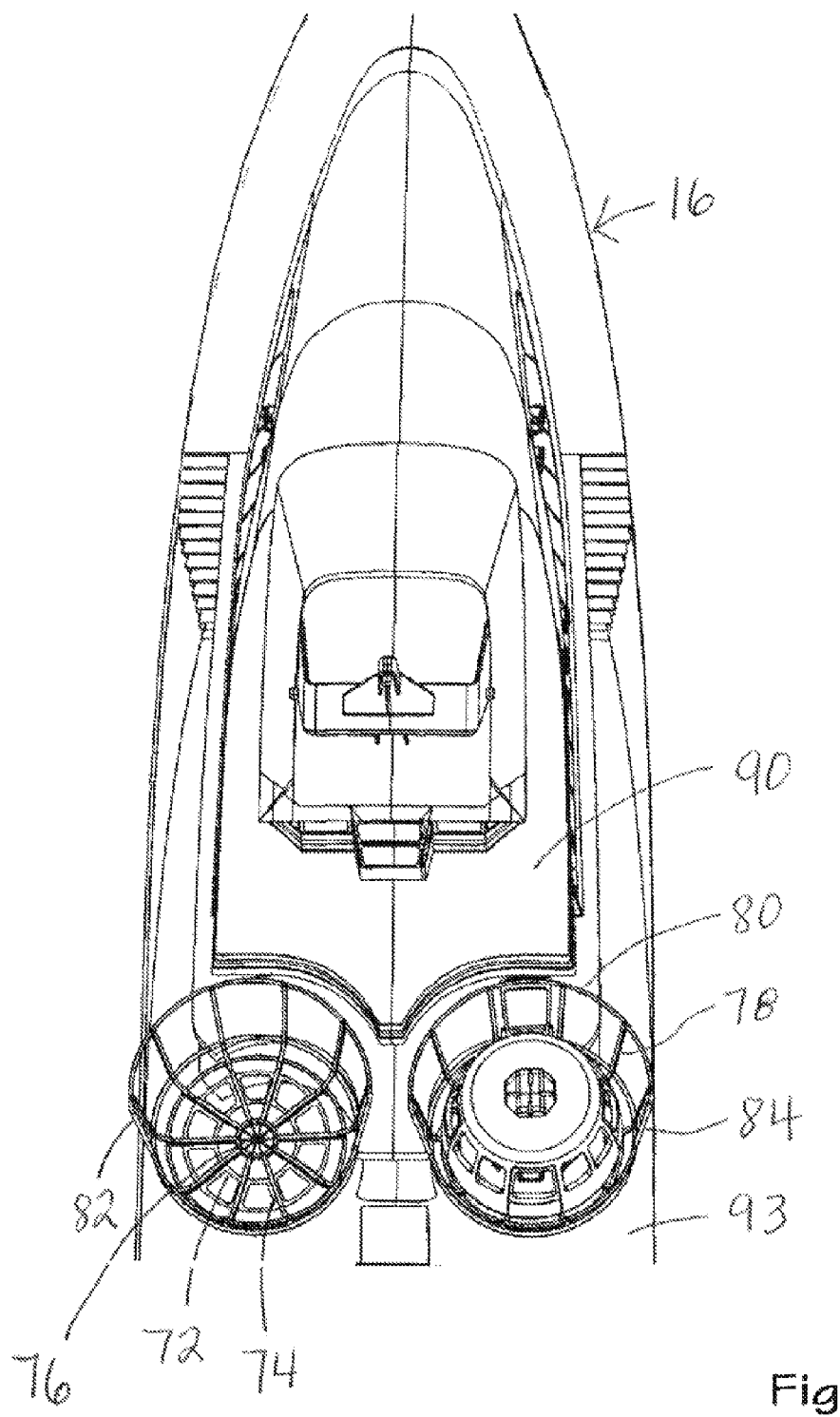
FIG. 5 is a top view showing one empty cradle on the crew boat and one personnel pod positioned in the pod cradle.
Figure 6:
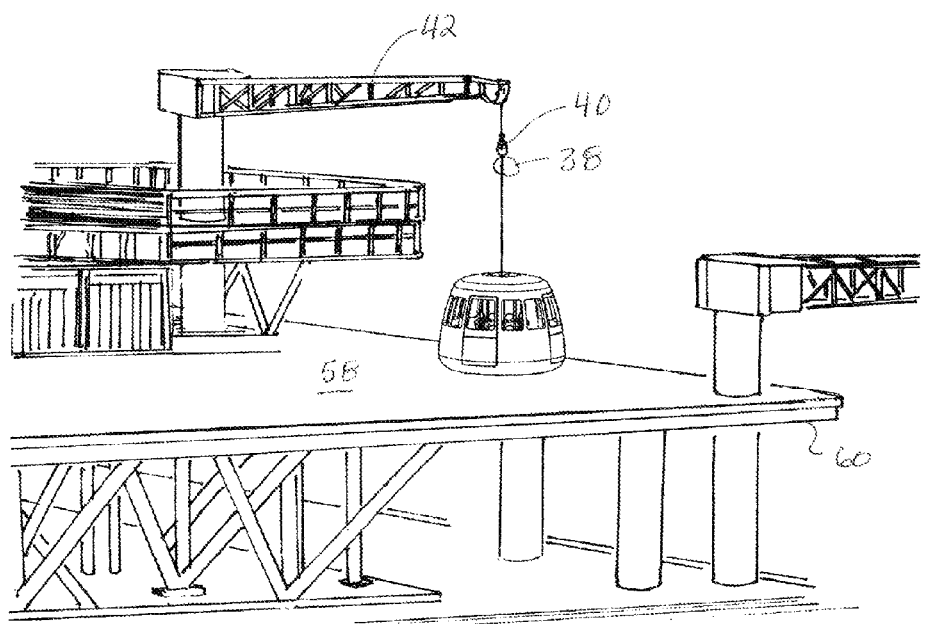
FIG. 6 illustrates one of the personnel pods being suspended by a platform-mounted crane above a landing deck of the offshore rig or platform.
Figure 7:
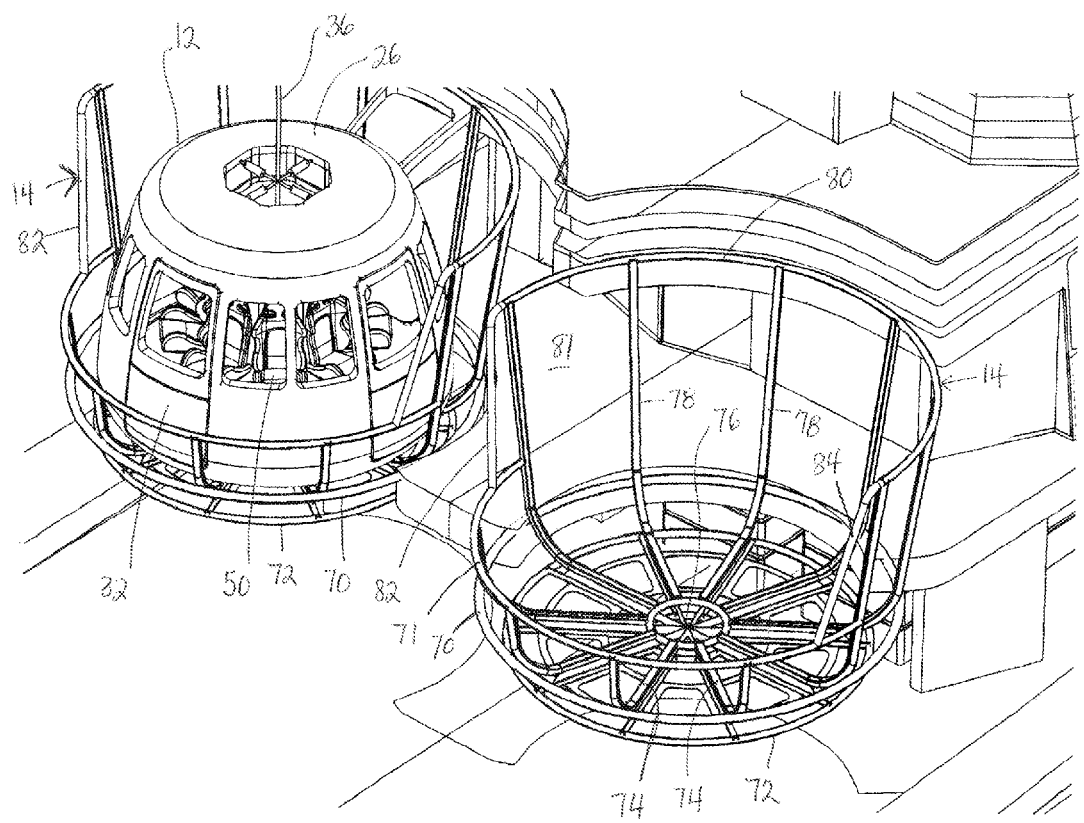
FIG. 7 is a perspective view of the personnel pod and pod cradles.
Figure 8:
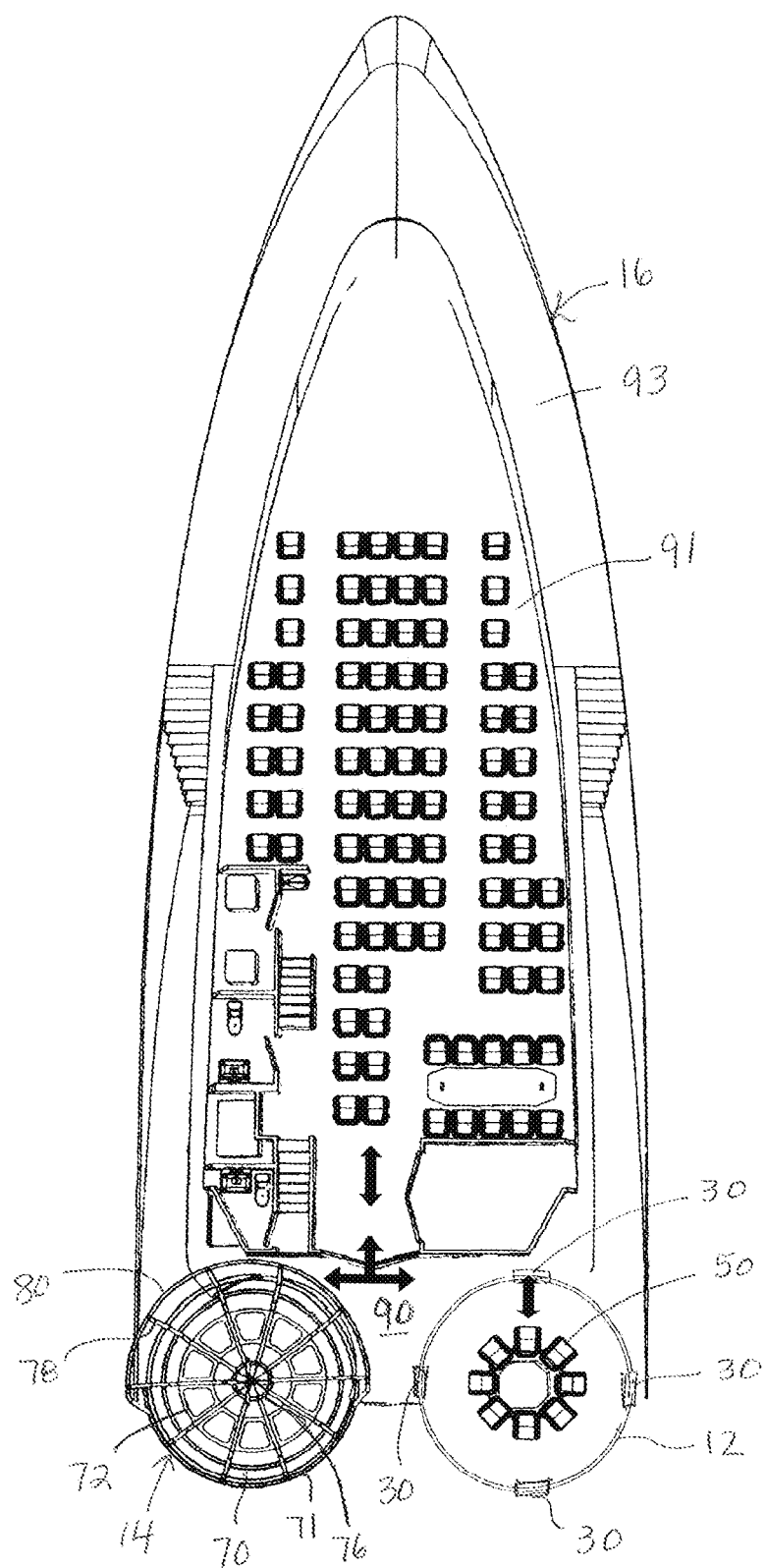
FIG. 8 is a top view of a pod cradle mounted on a passenger deck of the crew boat and schematically showing a layout of the personnel pod seating arrangement.
Figure 9:
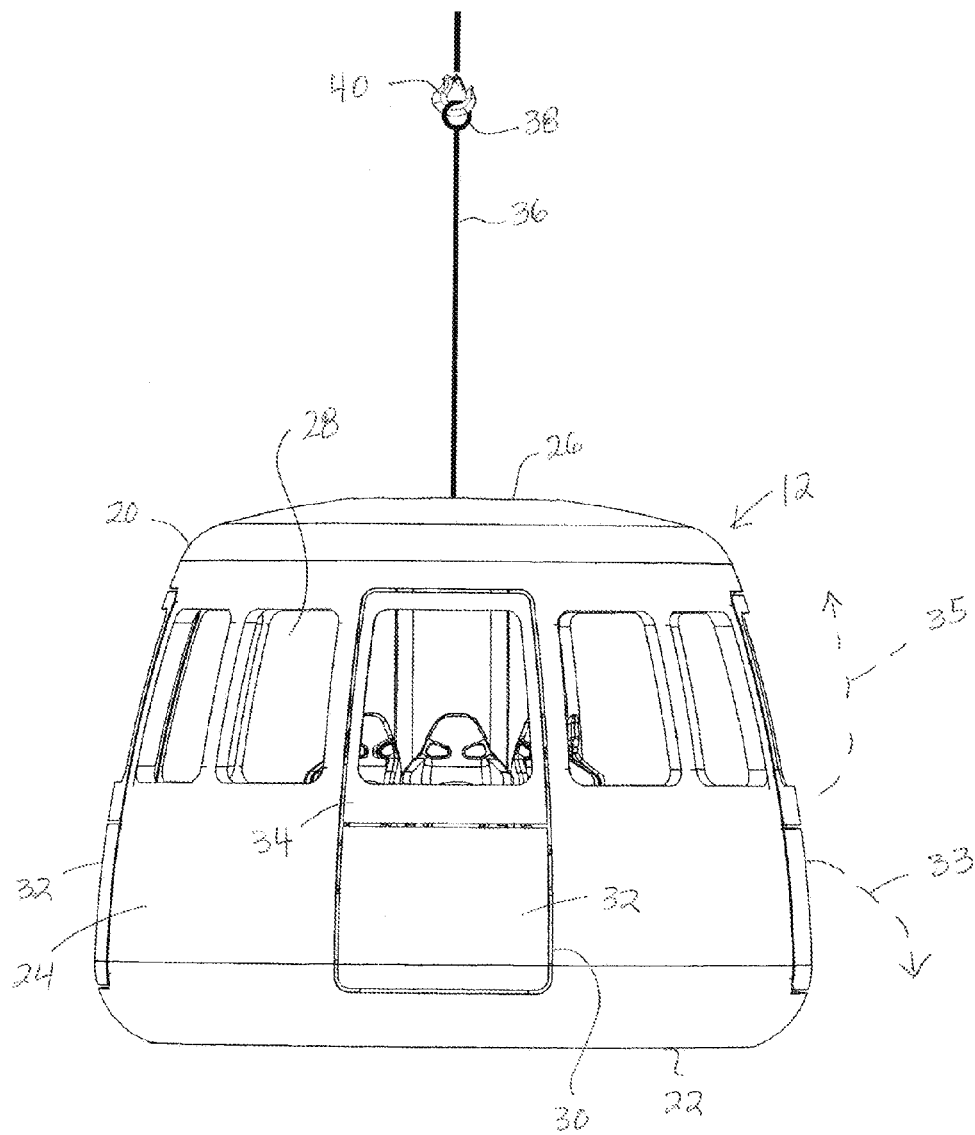
FIG. 9 is an elevation view of the personnel pod according to the present invention.

Turning now to the drawings in more detail, numeral 10 designates the personnel transport and transfer system according to the present invention. The system 10 comprises an autonomous marine vehicle, such as a floating motorized vessel or crew boat 16 equipped with one or more personnel pods or capsules 12 engageable in supporting pod cradles 14 during transport. The crew boat 16 has a rigid hull 17 and a plurality of decks, including a passenger deck, a pilot house deck, and a main deck, as will be described below. The boat 16 has independent navigation and guidance system 19, which is operated by the boat crew from a pilot house 21.

Each of the pod cradles 14 is configured to hold and stabilize a personnel pod 12 during transport on the crew boat or vessel 16 during a voyage to and from an offshore location. In one exemplary embodiment, the system comprises a pair of capsules 12 and a corresponding pair of pod cradles 14. The personnel pods 12 are located amidships, behind a passenger cabin 91—this central location has the least combined roll, heave and pitch motion on the vessel.

Figure 10:
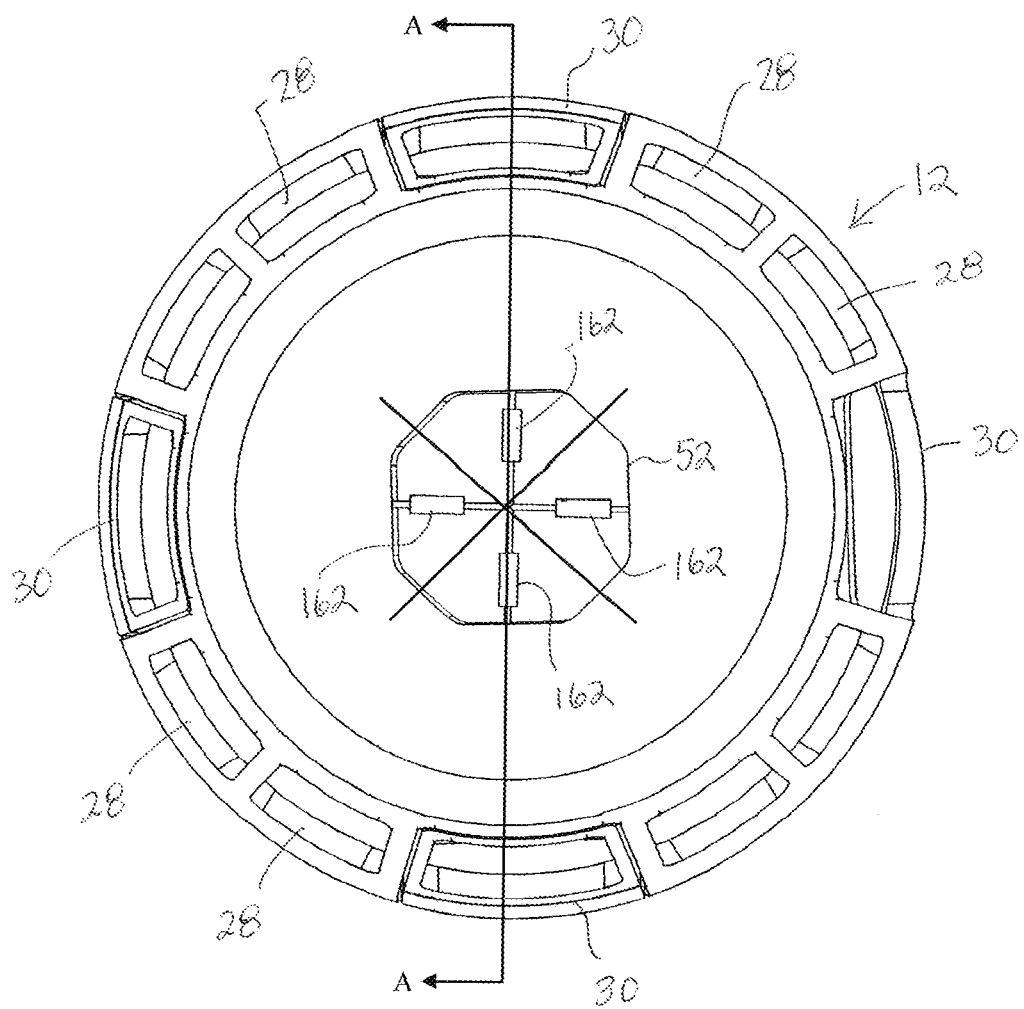
FIG. 10 is a plan view of the personnel pod according to the present invention.
Figure 11:
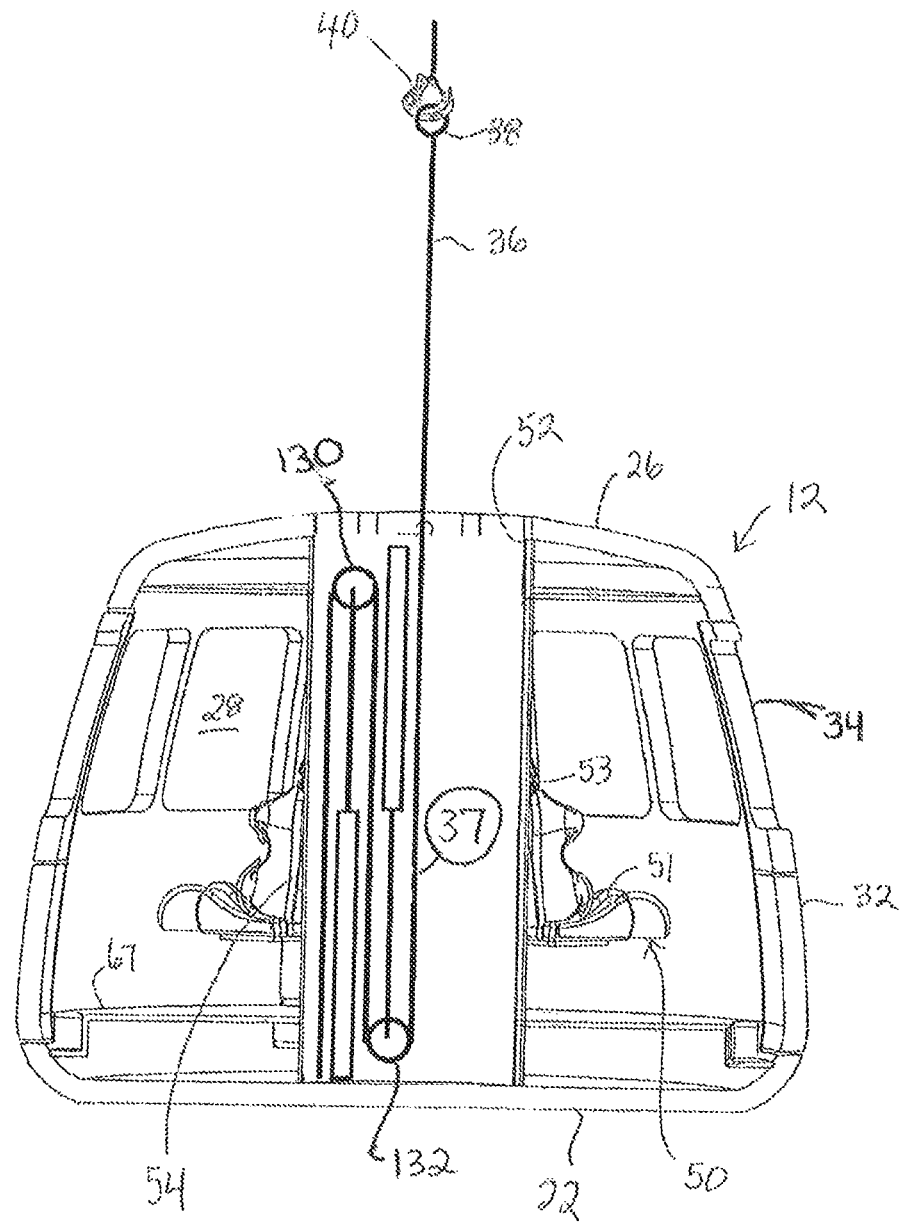
FIG. 11 is a vertical sectional view taken along lines A-A of FIG. 10.
Figure 12:
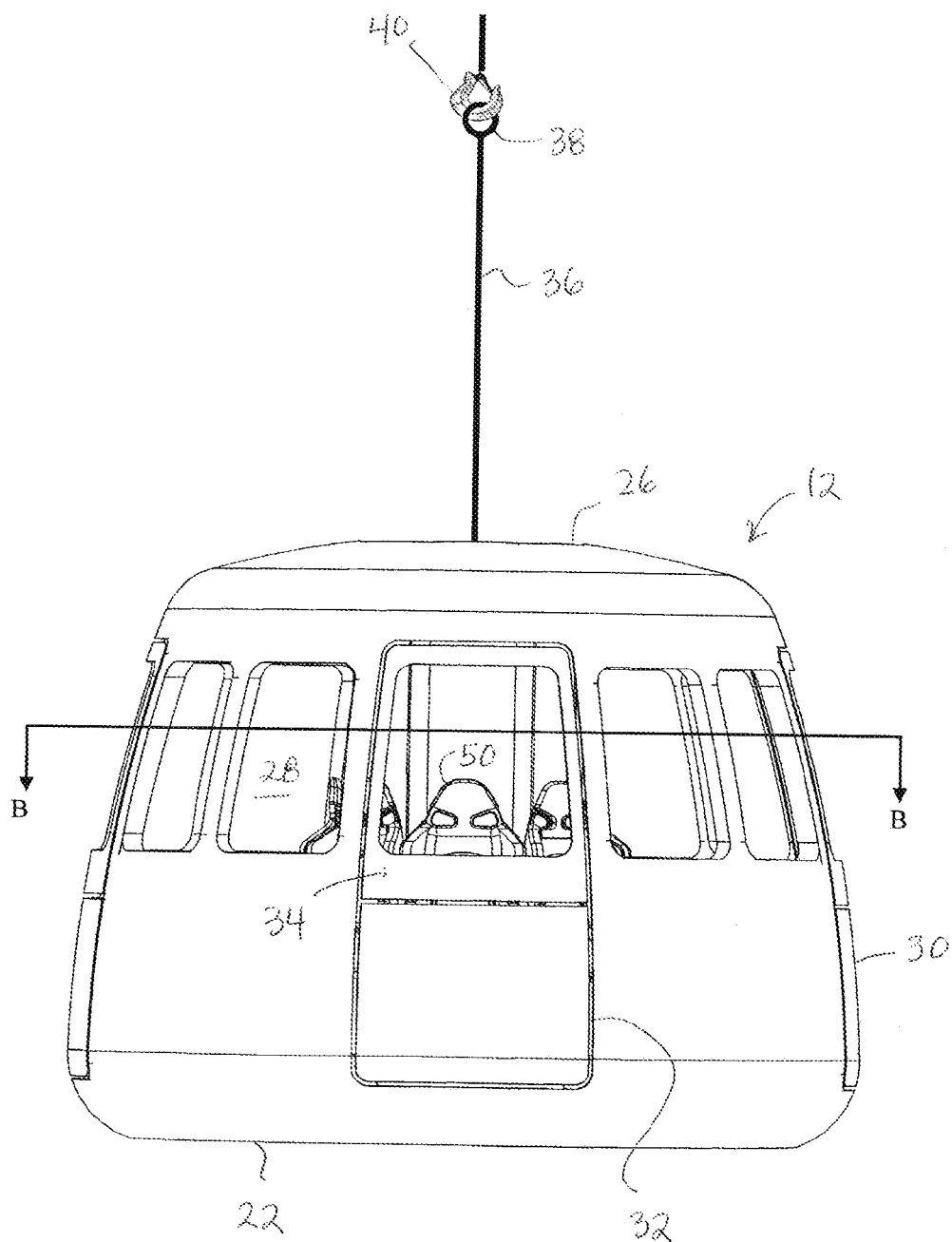
FIG. 12 is a plan view of the personnel pod according to the present invention rotated 90 degrees in relation to the view of FIG. 9.
Figure 13:
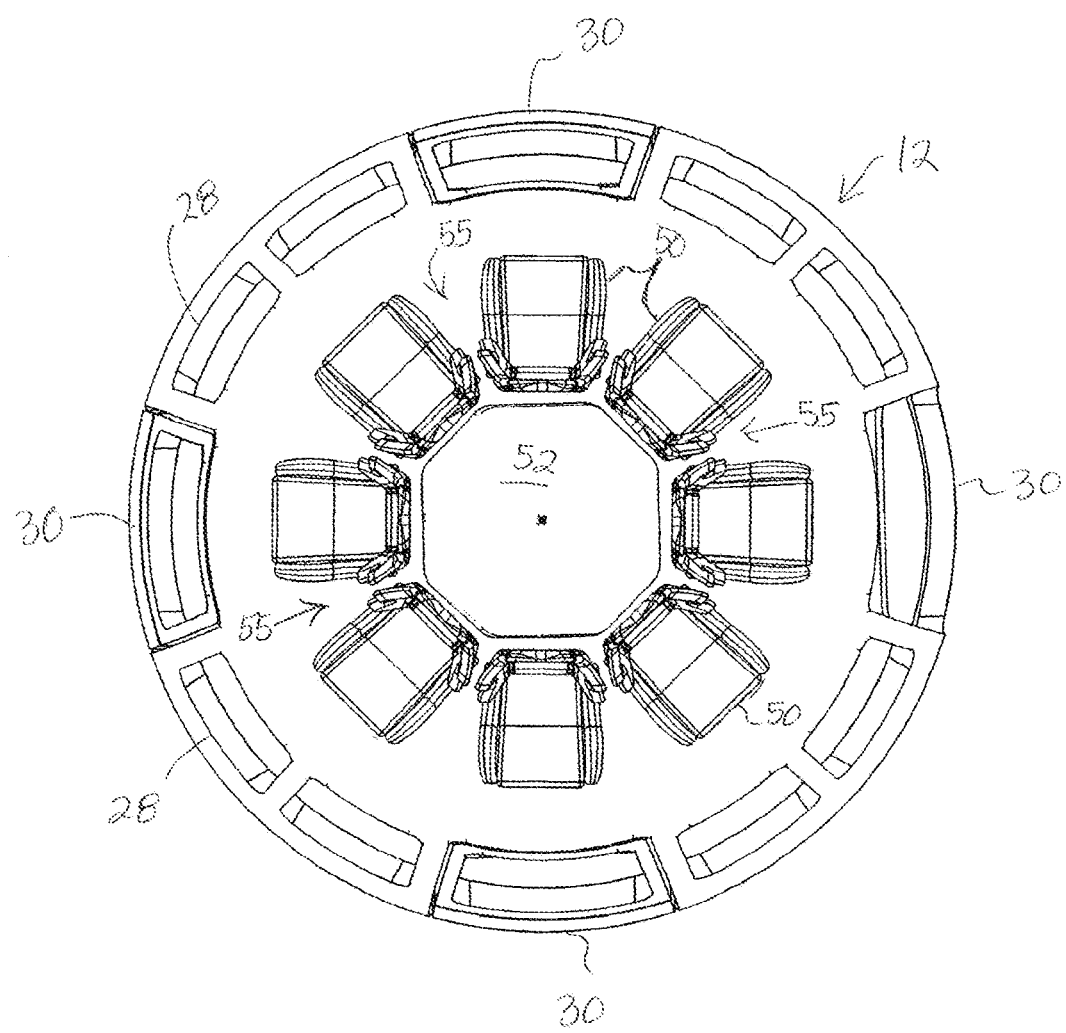
FIG. 13 is a cross-sectional view taken along lines B-B of FIG. 12 and showing seating plan of the personnel pod interior.
Figure 14:
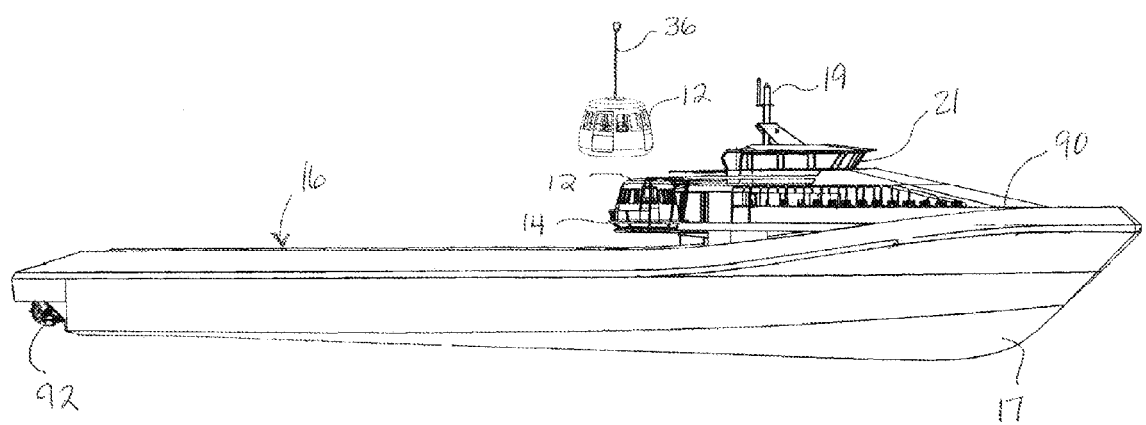
FIG. 14 illustrates position of the personnel pod and pod cradle amidships of the crew boat.
Figure 15:
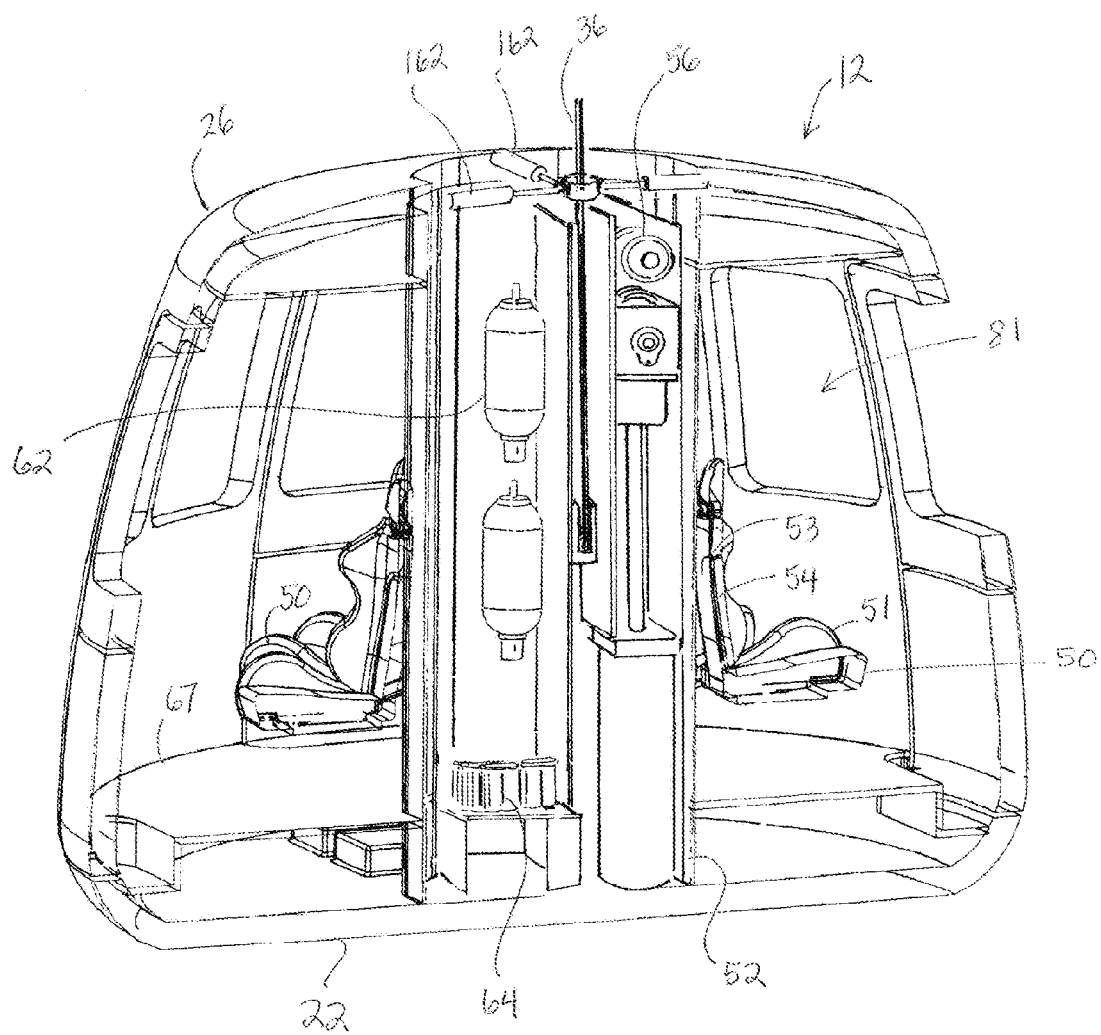
FIG. 15 is a sectional view of the personnel pod showing an anti-sway device, heave compensation system, shock absorber assembly and power supply mounted in a center column.
Figure 16:
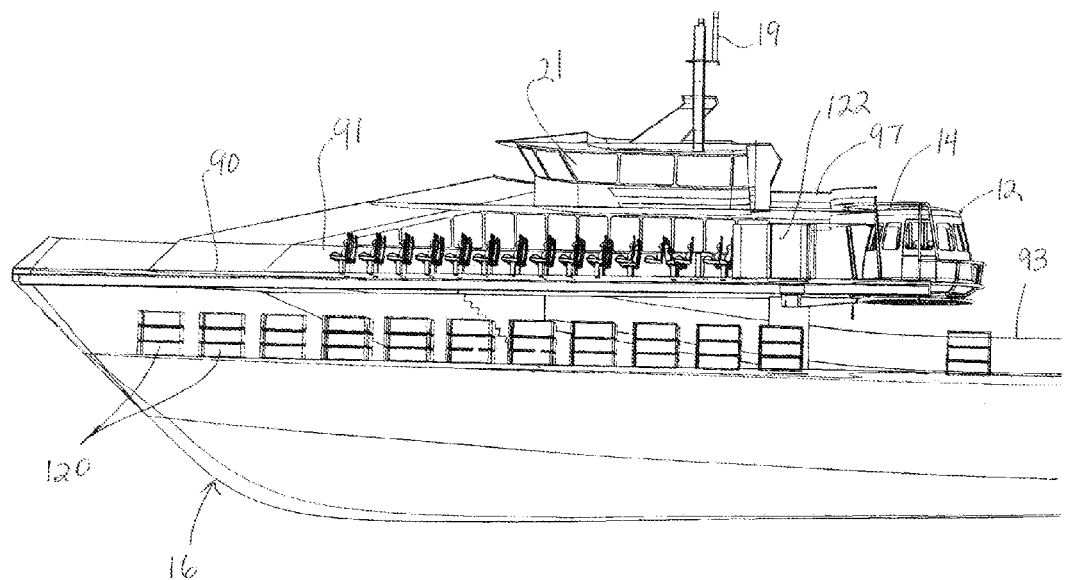
FIG. 16 illustrates seating arrangement and cargo bay on the crew boat.

Each capsule 12 comprises a watertight buoyant enclosure 20 having a flat bottom 22, upwardly extending walls 24 and a closed top or roof 26 extending between the walls 24. Each capsule 12 is constructed of structural metal with a composite shell and provides accommodation for seated passengers and their associated luggage and equipment. The capsule 12 has a substantially circular horizontal cross-section, as shown in FIGS. 10 and 13, although it is envisioned that other shapes can be used for forming the capsules 12. In one preferred embodiment, the capsule 12 is designed to support about 8,000 lbs maximum weight, be eight feet in height and about twelve feet in diameter.

A plurality of windows 28 is formed in the upright walls 24. The capsule 12 is provided with four doors 30 spaced at about 90 degrees from each other. The doors 30 allow egress and ingress of the persons to and from the capsules 12. While docked, the pod access is strategically limited to a single door 30 facing the passenger deck on the crew vessel 16 or on the platform 60. The doors 30 are split horizontally with the lower section 32 being configured to swing pivotally down in the direction of arrow 33 to become a loading ramp and the upper section 34—to swing pivotally up in the direction of arrow 35, to provide a weather cover when entering and exiting the capsule 12.

A suspension rod 36 extends upwardly above the roof 26 of the capsule 12. The suspension rod 36 can be a telescoping rod extendable upon demand above the roof 26. A lifting eye 38 is secured on the top of the suspension rod 36; the lifting eye 38 is designed to be engaged by a lifting hook 40 of a platform mounted crane 42.

Each capsule 12 is provided with a plurality of passenger seats 50 mounted in radially extending positions around a center column 52. In one exemplary embodiment, each pod 12 is equipped with eight passenger seats 50. Each passenger seat 50 has a seat member 51 and a backrest 53. Each passenger seat 50 is resiliently mounted to the supporting center column 52 and is provided with a five-point safety harness system 54 similar to that a racing car seat. Spaces 55 between the passenger seats 50 may be used for holding personnel luggage, equipment and the like. When seated, the passengers in the capsule 12 face outward with personal effects and luggage stowed under, between and in front of the seats 50.

An anti-sway device 56 is mounted in the center column 52 to dampen the induced motions as the capsule 12 is lifted and lowered. The anti-sway device 56 eliminates passenger discomfort and allows easy docking of the capsule 12 to the pod cradle 14 and the landing deck 58 of the drilling platform 60. An automated heave compensation system (AHCS) 62 is incorporated into the central column 52 of the capsule 12 to ensure a soft lowering and raising of the capsule 12 to and from the vessel-mounted pod cradle 14 when sea conditions cause excessive heave. In one aspect of the invention, the heave compensation system 62 is positioned below the anti-sway device 56 in the center column 52.

Figure 18:
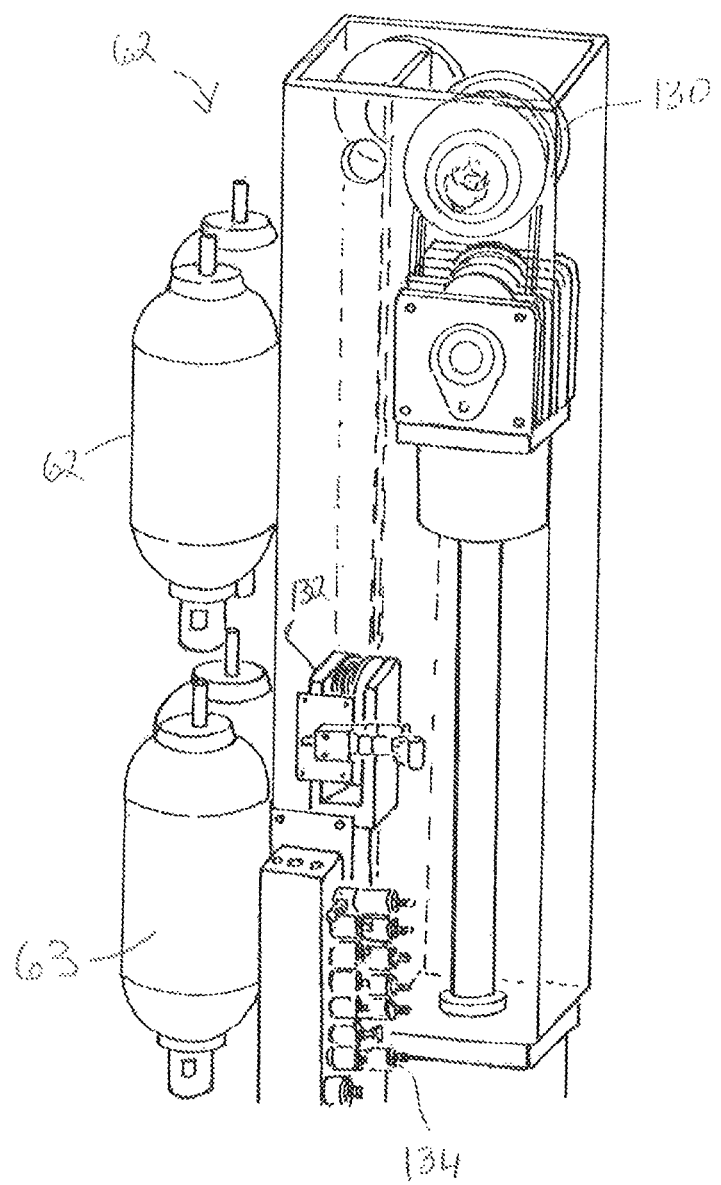
FIG. 18 is a detail view showing a main winch and the compensator winch of the heave compensation system of the present invention.
Figure 19:
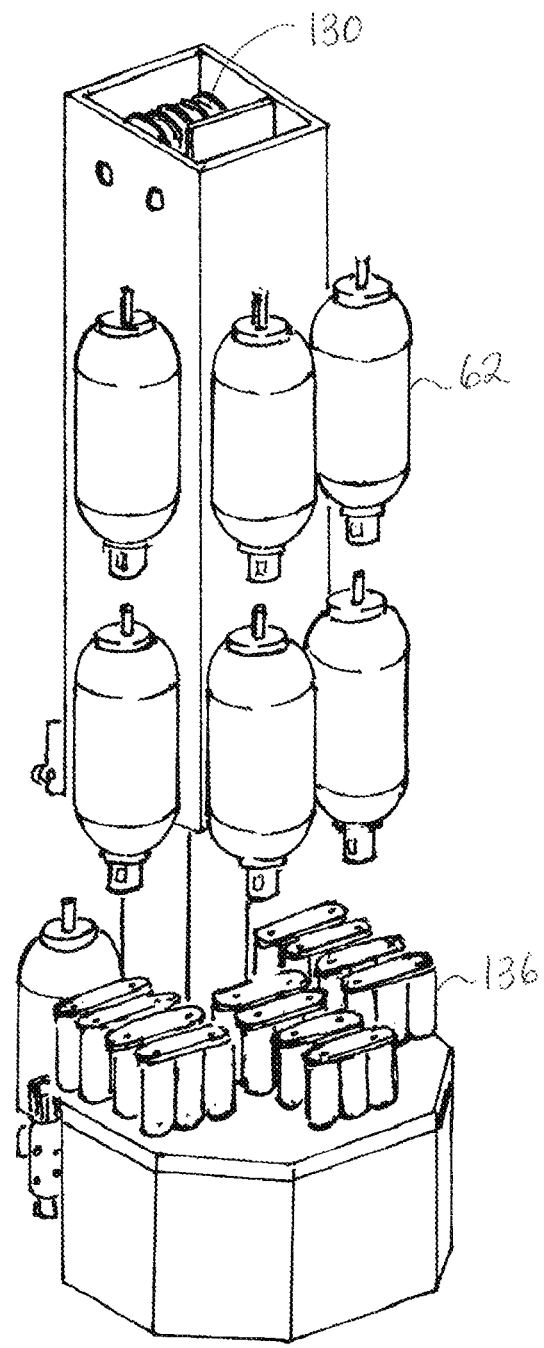
FIG. 19 is a detail view illustrating the heave compensation assembly and a battery bank.

As illustrated in FIGS. 18 and 19, the heave compensation system 62 located in the central column 52, comprises a plurality of pressure tanks 63, a main winch 130, a heave compensator winch 132, a length of cable 37 wound on the winches 130, 132 and extending therebetween, a custom valve bank 134, and a self-contained power supply 136. The power supply can be 36 volt AGM battery bank. The cable 37 is connected to the suspension rod 36.

In the preferred embodiment, the cradles 14 are positioned near the amidships where ship motions are at their minimum. The capsules 12 have the ability to self-winch from below the crane hook—the system therefore relies less on a crane operator with limited visibility. With the crane hook 40 in a static position, suspending the capsule 12 clear of any structure above the cradle 14, the crew member on a Pilot House deck 97 activates the Heave Compensation System 62 using a WiFi-linked iPad, or similar tablet, controller. The capsule 12 lowers itself into the cradle 14 synchronizing with the vessel's heave motion—the height differences are monitored using a laser targeting system. The heave compensation system fits inside center column 52 of the capsule 12. The battery bank may be located under the floor 67 of the capsule 12, which helps to keep the center of gravity as low as possible. A benefit of a lower center of gravity is an improved stability should the pod dump in the sea. In one aspect of the invention, the batteries are recharged or topped up while the capsule 12 is at rest in the cradle 14.

The capsule 12 is fitted with lighting and air conditioning systems to allow transfer of personnel in all weather conditions day or night. The batteries 64 are configured to power the lighting, the air conditioning and the AHCS of the capsule 12. The capsule 12 is also a fully approved lifeboat in the event of an accidental dumping of the pod 12 in the sea. The doors 30 and windows 28 of the personnel pod 12 are fully watertight.

In one aspect of the invention, there are two capsules 12 provided to allow the loading and unloading of passengers to be continuous; one personnel pod 12 can discharge passengers while the other personnel pod 12 is loading passengers thus reducing transfer time.

The pod cradle 14 is built as an open frame structure comprised of a plurality of elongated beams secured together to form a basket-like stabilizing structure. A bottom of the cradle 14 is formed by at least one ring-shaped member 72 intercepted by a plurality of bottom beams 74, which extend radially from a common center 76. Some of the bottom beams 74 extend upwardly from the bottom in a continuous unitary manner to form side beams 78 oriented at an obtuse angle in relation to the at least one bottom ring-shaped member 72. One or more intermediate arcuate or ring-shaped members 70, 71 are retained in a concentric vertically spaced-apart relationship to the at least one bottom ring-shaped member 72 and to each other, by the side beams 78. The cradle also has end beams 82, 84, which are secured to an uppermost intermediate arcuate member 71, at its lower end, and to a top arcuate beam 80—at their upper ends.

The top of the cradle 14 is formed by the arcuate beam 80, which connects upper ends of the side beams 78 and end beams 82, 84. An access area 81 is formed between adjacent side beams 78 to allow the personnel to safely enter and exit the personnel pod 12. The side beams 78 and the end beams 82, 84 of the cradle 14 form a stabilizing enclosure for the personnel pod 12. It is envisioned that the access area will occupy less than one-half of the circumference of the pod cradle 14. The pod cradle 14 provides for an easy egress for passengers from several doors 30 mounted in the capsule 12.

The pod cradles 14 are mounted near amidships of the crew boat 16. This location positions the capsules 12 in the location of the crew boat with the least motion. The pod cradles 14 are mounted so to be in the direct line of sight of the crew boat captain allowing the captain to closely monitor the loading and unloading operation.

The fast crew supply vessel 16 that carries the capsules 12 is fitted with a Quantum MagLift lower-speed/zero-speed stabilizer system 101 (schematically shown in FIG. 17) that will be automatically deployed at speeds below 15 knots. This has shown a 75% reduction in the roll of the vessel 16. With the stabilizers and personnel pods 12 fitted to the vessel, the vessel 16 will be able to be unloaded at least 30 more days per year than a vessel without the stabilizers and the personnel transport system 10. The fast crew supply boat 16 can easily carry 149 passengers. The Quantum MagLift lower-speed/zero-speed stabilizer system 101 reduces the roll of the vessel 16 while it is dynamically positioned alongside an offshore rig or platform 60.

Figure 17:
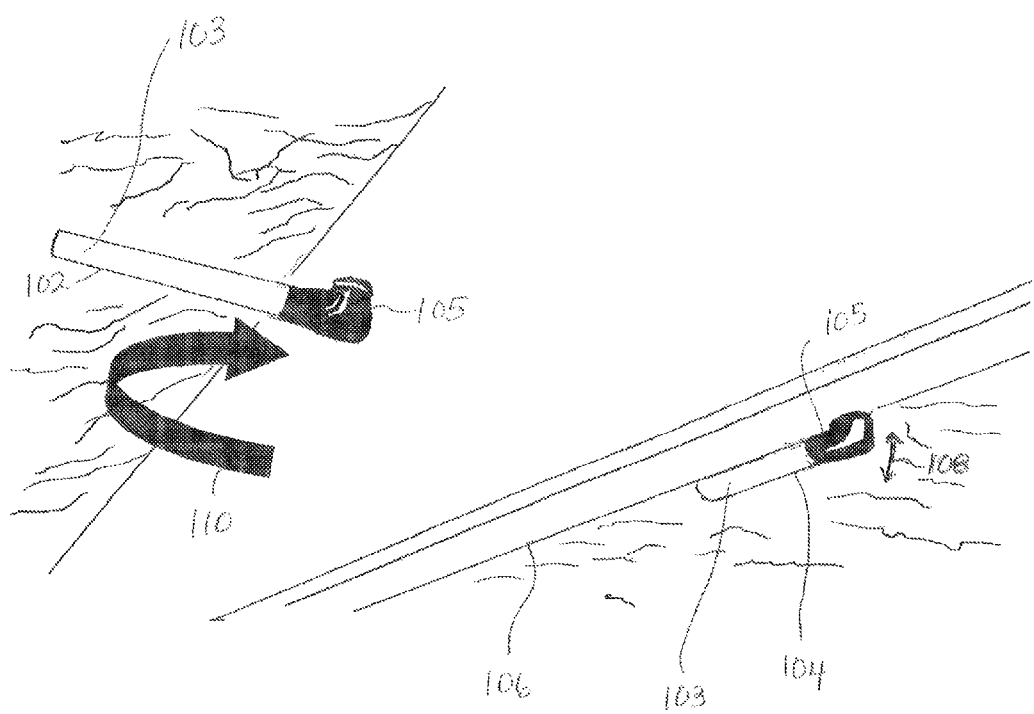
FIG. 17 illustrates the crew boat stabilization assembly of the system of the present invention.

As shown in FIG. 17, the stabilizer system 101 comprises a pair of stabilizer arms 102, 104 mounted to the hull bottom 106 of the boat 16. The stabilizer arms 102, 104 are positioned amidships adjacent the port and starboard of the boat. Each stabilizer arm 102 and 104 has an elongated configuration with a first part 103 extending substantially parallel to the bottom 106 and a second part 105, which is attached to the hull bottom 106 and extends transversely to the first part 103. Each stabilizer arm 102, 104 is configured to pivot about a vertical axis 108, at the area of attachment of the stabilizer arm to the hull bottom.

When operational at zero speed, the stabilizer arms 102, 104, swing back and forth in a horizontal arc, while the first part 103 spins in the flow of water, as schematically illustrated by an arrow 110. The movement of the first part 103 provides vertical lift in either direction to reduce roll of the crew boat 16. Positioning of the stabilizer arms 102, 104 in the boundary layer region of the under hull flow results in the least drag and minimum exposure to impact damage from underwater objects.

The crew boat 16 is designed with an extra, passenger deck 90 above the main deck 93. The passenger deck 90 is dedicated for passengers seated in a passenger cabin 91 positioned on the deck 90. The passenger deck 90 allows the pod cradles 14 to be mounted above and off of the main deck 93 thus not interfering with the space normally allocated for cargo. This above-the-main-deck location of passengers provides for the passengers to enter the personnel pods 12 directly from the deck 90 where the passengers are seated. An added benefit of the extra deck is an approximate forty percent increase in available deck area for carrying bulk and specialty containerized cargo.

A water jet propulsion system 92 employed on the crew boat 16 provides improved maneuverability. The water jets also provide a reduction in heave (up and down motion) while in Dynamic Positioning Mode. This is due to the reverse buckets providing a downward-vectored thrust while in position keeping mode. When in a position-keeping mode, the water jets reduce pitch motions of the vessel 16 by up to 80%.

The crew boat 16, in addition to carrying crew, can be configured to deliver various loads to the offshore platform 60. The containers 120 loaded into the cargo bay may be used for delivering drilling fluids, diesel, fresh water, provisions, etc. Some of the containers 120, for instance the containers with provisions may be refrigerated. The boat electric system is configured to deliver electricity into the bay area, and an electric receptacle may be provided for connecting to the electric supply. The containers 120 may be also positioned on the main deck 93, where they are secured in the conventional manner. A luggage compartment 122 is located on the deck 90 for convenience of the personnel.

Figure 20:
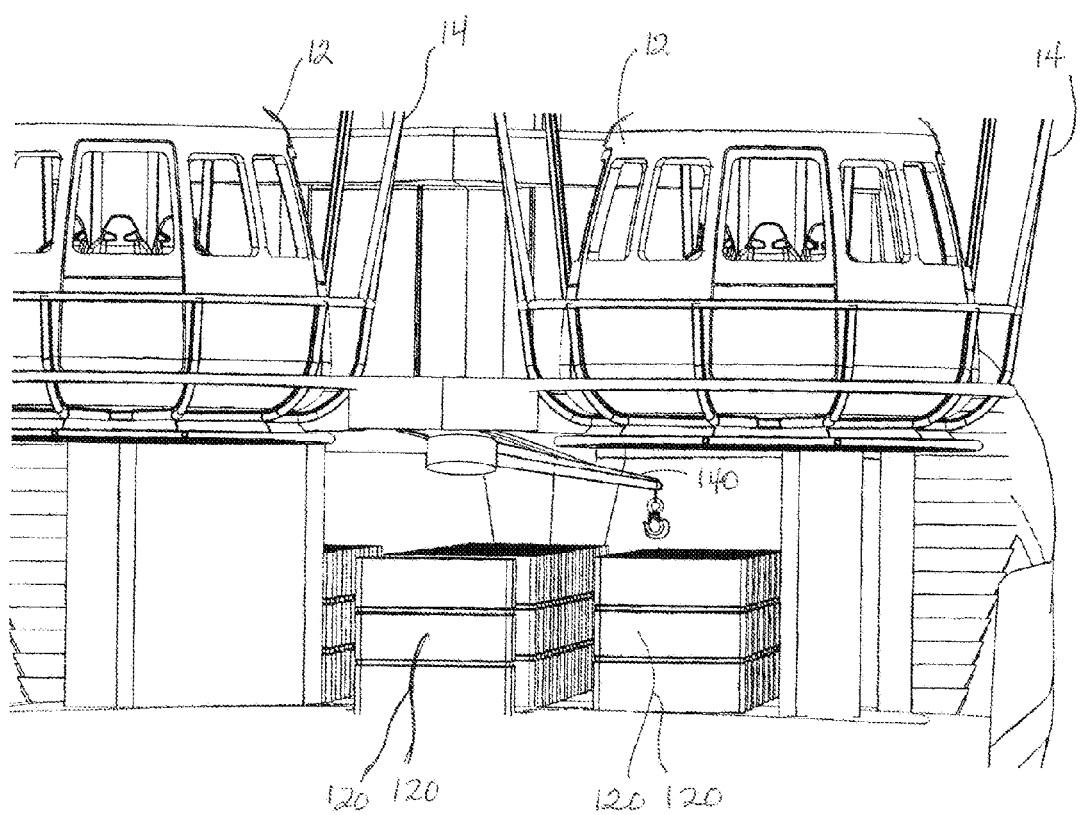
FIG. 20 is a detail view illustrating a cargo bay area with a linear crane system positioned under the passenger deck.

FIG. 20 illustrates a linear crane system 140 mounted under the passenger deck of the vessel 16. The crane system is used to transfer the mini-containers 120 to the lift area of the main deck 93. The linear crane 140 may be powered by an electro-hydraulic power unit. The mini containers 120, some which may be refrigerated, are independently secured to the main deck until needed.

Figure 21:
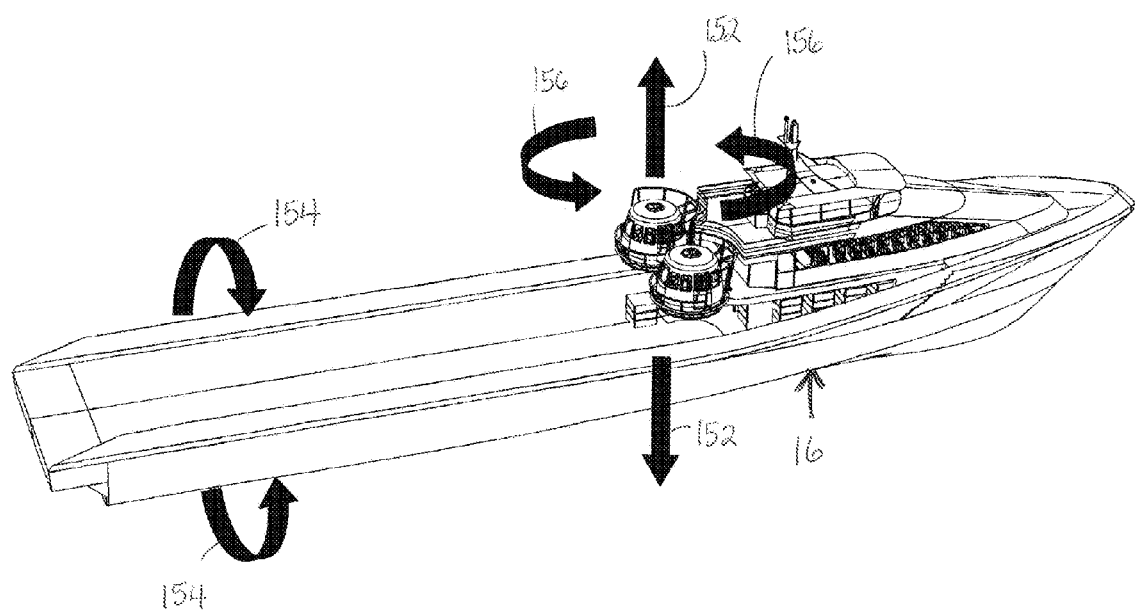
FIG. 21 schematically illustrates wave compensation and stabilization means used in the system of the present invention.

FIG. 21 schematically illustrates wave compensation and stabilization means used in the system of the present invention. The heave compensation system allows for variation of height or heave of the vessel 16, as shown by arrows 152. The water jets at the aft of the vessel 16 reduce pitch, while the stabilizers reduce roll of the vessel, as shown by arrows 154. DP2 positioning system 19 fixes lateral position of the boat and prevents the vessel yaw, as shown by arrows 156. All these features, in combination with the location of the capsules 12 amidships provides for a stable personnel transfer system.

A radar and laser guided DP2 positioning system 19 keeps the boat 16 stationed within a few inches of a target location a given distance from the rig, which is ideal for the pod deployment.

Figure 22:
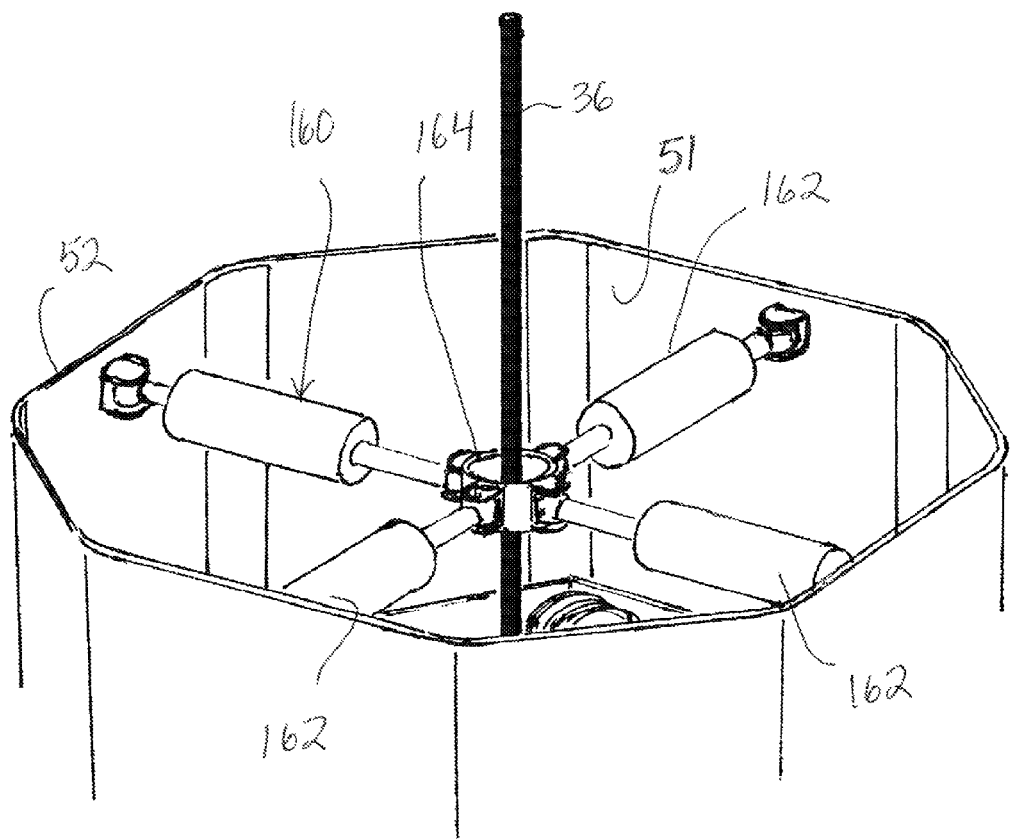
FIG. 22 is a detail view illustrating a shock absorber assembly mounted in the upper part of the center column.

To further enhance comfort of personnel transported in the personnel capsule 12, the system of the present invention provides for the use of a shock absorber assembly 160 mounted in the upper part of the center column 52. As can be seen in FIG. 22, the shock absorber assembly comprises a plurality of shock absorber cylinders 162 extending horizontally in the center column 52. In one particular embodiment, the system uses four shock absorber cylinders 162, each of which is independently secured to an inner wall 51 of the center column 52 and to a ring-shaped securing member 164, which retains all shock absorber cylinders 162 in a spaced-apart equidistant relationship to each other. The shock absorber cylinders 162 can be seen radiating from the centrally positioned securing member 164. The suspension rod 36 passes through the ring formed by the securing member 164. The securing member 164 prevents misalignment of the suspension rod 36 as the personnel capsule 12 is lifted and lowered by the crane 42.

In operation, the crew and the personnel board the vessel 16 at side and back—they traverse the aft deck and climb stairs or use elevator to the passenger seating compartment or cabin 91 on the upper passenger deck 90. For safety reasons, the personnel are not allowed to enter the cargo bay.

Once the cargo and the personnel are loaded, the crew boat 16 sprints to the platform 60 at speeds up to 40 knots with cargo and passengers. As the crew boat 16 arrives at the platform 60 it slows below 15 knots. As the crew boat slows below 15 knots the MagLift stabilizers deploy and immediately begin to reduce the roll of the crew boat 16 by 75%. The crew boat captain maneuvers the crew boat 16 into position as directed by the platform manager and deploys its Dynamic Positioning System, automated position keeping system, and maintains station to begin the loading and unloading of cargo and personnel.

The personnel being transported to the platform is directed to enter the personnel pod 12 in the pod cradle 14 on the crew boat 16 with their luggage and ancillary equipment. The crane 42 operator on the platform 60 positions his crane over the crew boat 16 and lowers the hook 40 of the platform-mounted crane 42 to the crew boat 16. The crew on the crew boat 16 fastens the hook 40 from the platform mounted crane 42 to the lifting eye 38 of the suspension rod 36. When the capsule 12 is ready for transfer to the rig 60 the boat's crew member controls the capsule's heave compensation system 62 to lift the capsule 12 clear of the cradle 14 using an iPad style Wi-fi controller. The capsule 12 is softly lifted from the pod cradle 14 utilizing the pod mounted automated heave compensation system (AHCS) 62 to smooth out the remaining heave motion of the crew boat 16.

The pod 12 is lifted from the pod cradle 14, and the rig's crane operator is notified that the capsule 12 is clear of the cradle 14. The crane operator is instructed to lift the capsule 12 to the landing deck 58 of the rig 60 and lowered to the landing deck 58. The personnel egress the pod 12 with their luggage and enter the platform. The crane operator on the platform lowers the hook 40 to the crew boat 16 and hooks onto the next pod 12 mounted on the crew boat 16 and raises it to the landing deck 58 of the platform 60.

The loading procedure is reversed for the returning capsule 12. The pod resting on the landing deck 58 of the platform 60 is loaded with personnel returning to shore. The pod 12 is raised from the landing deck 58 of the platform 60 with the returning personnel onboard and is lowered to the cradle 14 onboard the crew boat 16. The rig's crane operator lowers the pod 12 until it is just above the cradle 14; the crane hook stops and the heave compensation system lowers the pod 12 into the cradle 14 in sync with the motion of the boat 16. The AHCS 62 then lowers the pod 12 to its resting place in the pod cradle 14 softly. The personnel then exit the pod 12 and enter the crew boat 16 for the return trip to shore.

If there are more personnel to be transferred the process is repeated till all personnel have been transferred. The crew boat captain disables the system 10 and maneuvers the crew boat 16 away from the platform 60. The Maglift Stabilizer system folds into its stored position as the crew boat 16 accelerates above 15 knots and the captain pilots the crew boat to shore.

If necessary the crew boat 16 can provide sleeping accommodations for the personnel on a lower deck. Passenger ID scan system is provided on the vessel 16 to register the personnel boarding into the vessel 16, then into the capsule 12, and lastly—to the platform 60. After the capsule 12 has been lowered to the rig landing deck 58, the passengers embarking or disembarking are required to pass their ID cards through the capsule 12 ID scanner to thereby complete the passenger register. A complete passenger register is kept at all times.

The system of this invention allows transporting the passengers from the crew boat to the offshore platform in a fully enclosed capsule, which ensures safety and eliminates anxiety. Such approach has distinct advantages over traditional systems where offshore workers stand on lifting rings and hold on to nets while being lifted many feet above the sea from the aft cargo deck. In emergency, each capsule 12 can act as a life raft because each capsule forms a floatable body when the doors and windows are closed.

Many changes and modifications can be made in the system of the present invention without departing from the spirit thereof. We, therefore, pray that our rights to the present invention be limited only by the scope of the appended claims.

We claim:

1. An apparatus for transporting personnel from a marine vehicle to and from an offshore platform, comprising:
    at least one open-frame basket-shaped cradle mounted on the marine vehicle and at least one floatable passenger capsule removably positioned in the cradle, the at least one passenger capsule comprising a watertight buoyant enclosure having a center column extending from the bottom to the top of the enclosure, the at least one capsule being equipped with an anti-heave compensation system positioned in the center column, the anti-heave compensation system synchronizing heave of the at least one passenger capsule with heave of the marine vehicle, and a capsule shock absorber assembly, the at least one capsule being configured to be lifted and lowered by a crane of the offshore platform to and from the marine vessel and the offshore platform without tethering to the marine vessel,
    wherein the shock absorber assembly comprises a plurality of shock absorber cylinders extending transversely in an upper part of the center column, each of the shock absorber cylinders radiating from a centrally-positioned ring-shaped securing member mounted in the center column and retaining all shock absorber cylinders in a spaced-apart equidistant relationship to each other;
    wherein said at least one cradle comprises an open frame structure mounted on a deck of the marine vessel and comprised of a plurality of elongated beams secured together to form a basket-shaped stabilizing structure;
    wherein the at least one cradle comprises a bottom formed by at least one bottom ring-shaped member intercepted by a plurality of bottom beams, which extend radially from a common center; and
    wherein the at least one cradle comprises spaced-apart side beams extending upwardly from the at least one bottom ring-shaped member at an obtuse angle in relation to the bottom ring-shaped member to a distance above at least horizontal center of the at least one passenger capsule when the at least one passenger capsule is positioned in the at least one cradle.

2. The apparatus of claim 1, said at least one cradle comprising at least one intermediate arcuate member retained in a concentric vertically spaced-apart relationship to the bottom ring-shaped member by the side beams.

3. The apparatus of claim 1, the at least one cradle comprises a top arcuate beam secured to upper ends of the side beams.

* * * * *